3,749,581
PROCESS FOR PRODUCING EDIBLE PROTEIN FIBER
Takashi Sakita, Yokohama, Masaaki Ebisawa, Kawasaki, and Hiroshi Mimoto, Yokohama, Japan, assignors to The Nisshin Oil Mills, Ltd., Tokyo, Japan
Filed Jan. 29, 1971, Ser. No. 110,977
Claims priority, application Japan, Dec. 10, 1970, 45/108,900
Int. Cl. A23j 1/14, 3/00
U.S. Cl. 99—14    7 Claims

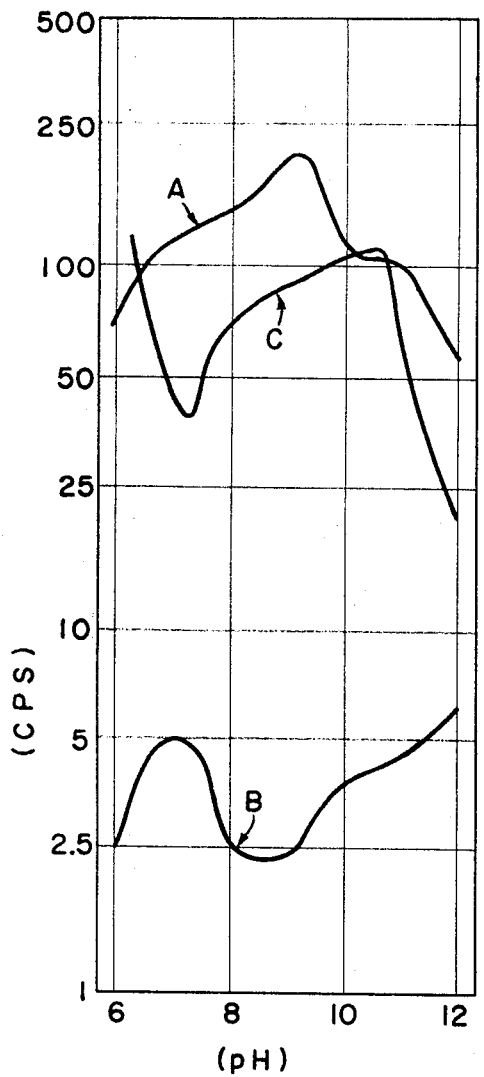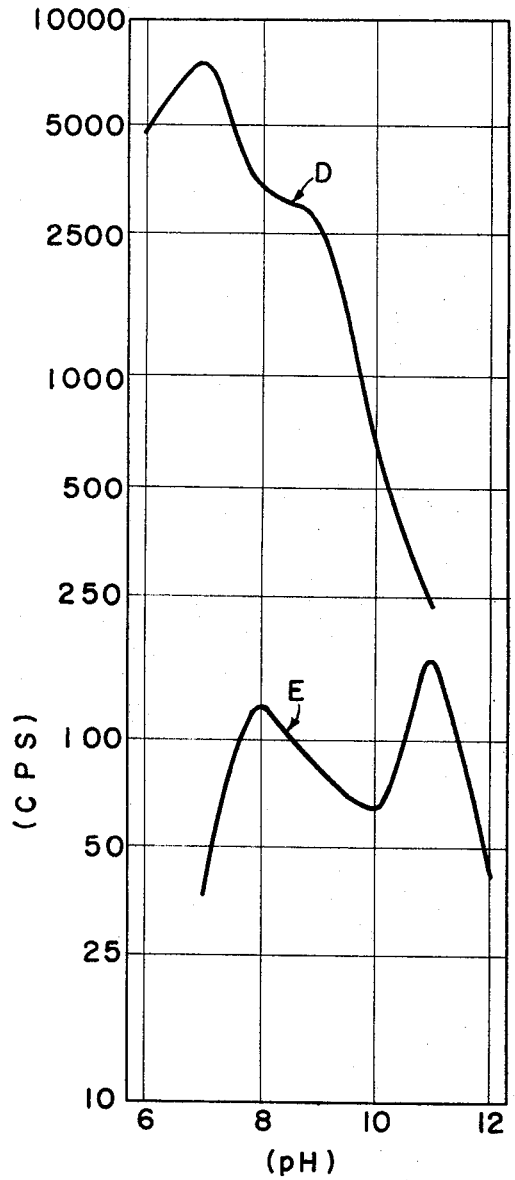
FIG.1
FIG.2

ABSTRACT OF THE DISCLOSURE

A process for producing edible protein fibers comprising preparing a spinning solution containing protein as the main ingredient with pH 5.5-11.0 from edible protein materials, continuously extruding the solution in a coagulation bath in form of filaments, characterized in that an additive selected from the group consisting of polyacrylic acid and alkali salts thereof is used in any step of the fiber producing procedures.

---

The present invention relates to a process for producing protein fiber from edible protein materials, in more detail, the present invention relates to a process for economically producing protein fiber with excellent properties by a simple means.

Various methods for preparing fibrous protein foods have been reported in U.S. Pats. 2,809,090 and 2,682,466, and these methods generally comprise the following five steps:

(1) Preparing protein curds by removing oil and fats and water-insoluble matter from the edible protein material.

(2) Preparing a peptized solution by mixing and dissolving the protein curds in an aqueous alkali solution to produce a solution containing 10 to 30% by weight of protein and having initial pH of 11.5-13.5 and then aging the solution generally about 30 minutes in order to obtain the maximum viscosity.

(3) Filtering and defoaming the peptized solution if necessary.

(4) Extruding of the peptized solution through fine holes with a diameter of 0.05-0.50 mm. into a coagulation bath comprising an acid and neutral salts and at the same time elongating and winding the resultant filaments at a constant velocity.

(5) Aging the resultant fiber or the bundle thereof in the coagulating bath, then if needed neutralizing to pH 4-7, rinsing or boiling in water and bleaching if desired.

These conventional methods stated above have disadvantages as follows:

Unless the oil and fats and water-insoluble matters are completely removed from the starting edible protein, extremely fragile and weak fiber would be obtained on spinning and yield after the neutralizing and rinsing would be decreased. Further the savor of the product would be damaged due to the deterioration of the incorporated oil and fats.

Further according to conventional methods the protein concentration of the spininng solution must be maintained in the range of 10–30% because if not so the spinning of the protein solution becomes impossible. Thus in practice the protein extract must be precipitated by an acid in order to produce protein curds, and thereafter the protein curds must be redissolved to produce the spinning solution. The pH of the peptized solution should be also adjusted to strongly alkaline, higher than pH 11.5. Moreover, the coagulation bath must comprise a neutral salt in addition of acid.

If any one of the factors above described would not be satisfied, the spinning would become impossible in practice.

Hence the conventional methods are extremely expensive and unsatisfactory in quality of the product.

Accordingly the main object of the present invention is to provide a novel method for production of edible protein fiber which can save the cost of equipment time, labor and also expensive acid and alkali, at the same time can prevent the mechanical loss of the product by simplifying the process of the conventional methods of production.

Another object of the present invention is to provide a means which can spin protein fibers from a low protein concentration solution.

Further object of the present invention is to provide a means which can make protein fibers from a protein solution with low pH value, thereby to avoid the disadvantages due to the high alkaline treatment which is deemed essential in the conventional method.

The other object of this invention is to provide an economical rapid method for preparation of the spinning solution.

The further object of the present invention is to provide a means for direct spinning a protein solution which contains oil and fats and other nonprotein materials, without any previous steps of precipitation and purification.

The other object of the present invention is to provide a method which can produce tough and suitably soft protein fiber with good chewing property preferable as a foodstuff.

The objects of the present invention cited above can be accomplished by a novel process according to the present invention which comprises using an additive selected from the group consisting of polyacrylic acid and the alkali salt and ammonium salt thereof in any desirable steps of preparing the protein fiber.

Accordnig to the present invention polyacrylic acid and salt thereof can be used during any step in preparing edible protein fiber, that is, said additive can be added to a starting protein material, a spinning solution or a coagulation bath.

The edible protein matter refers to vegetable and animal proteins.

The vegetable proteins include proteins from oil-bearing seed such as soya bean, sun flower, safflower, peanuts, cotton-seed and the like and the wheat protein, and the animal proteins include casein and gelatine, etc.

The polyacrylic acid and the salt thereof useful in the present invention are the water-soluble long linear macromolecular electrolytes having molecular weights of several millions, which have plural carboxylic groups along their hydrophobic vinyl chains. The molecular weight of the polyacrylic acids and salts employed in the present invention should be such that the degree of polymerization of the polymers is at least 15,000 and preferably 30,000 or more. The higher the molecular weight the larger spinning effect. Polyacrylic acid or the salt thereof have been used as a viscosity improving agent, flocculating agent, dispersing agent and a stabilizer as similar to sodium alginate, propylene glycol alginate ester, sodium, methyl cellulose, casein, sodium casein, starch sodium phosphate ester, tragacanth gum and the like. However, the effect of polyacrylic acid or the salt thereof on the spinning of protein has been unknown before the present invention and first studied by the present inventors. Thus the present inventors have discovered that only polyacrylic acid alkali metal salts thereof are extremely effective for the spinning of protein fiber, whereas other substances as described above are not effective to spinning of protein solution even at concentrations of more than 25 weight percent.

According to the present invention any commercial polyacrylate can be used. For instance "Aronvis" which are commercially available polyacrylates from Nippon Junyaku Kabushiki Kaisha are preferable useful products.

Said "Aronvis" are available in following grades:

| | Aronvis (sodium polyacrylate) | | |
|---|---|---|---|
| | S | M | F |
| Purity | >98% | >94% | >94%. |
| Weight loss on drying | <2% | <6% | <6%. |
| Maximum viscosity | 0.5–0.6 | 0.3–0.4 | 0.6–0.8 |
| Average polymerization degree | 30,000–40,000 | 15,000–20,000 | 40,000–60,000. |
| Viscosity (20° C., 30 r.p.m.): 0.5 aqueous solution | 1,400–1900 cps | 400–800 cps | 1,800–2,400 cps. |
| 1.0 aqueous solution | 3,500–5,500 cps | 1,500–2,500 cps | 5,500–8,500 cps. |
| pH (1% aqueous solution) | 8–9 | 8–9 | 8–9. |
| Grain size | –200 mesh | –50 mesh | –50 mesh. |
| Appearance | White powder without taste and odor. | White powder without taste and odor. | White powder without taste and odor. |
| Clearance (1% aqueous solution) | Transparent | Transparent | Transparent. |
| Free alkali | Not observed | Not observed | Not observed. |
| Sulfate ion (as $H_2SO_4$) | <0.35% | <0.49% | <0.49%. |
| Arsenic ($AsSO_3$) | <4 p.p.m | <10 p.p.m | <10 p.p.m. |
| Heavy metal (as lead) | <10 p.p.m | <20 p.p.m | <20 p.p.m. |
| Retain monomer | <1.0% | <1% | <1%. |
| Lower polymer | <5% | <5% | <5%. |
| Starch | Not observed | Not observed | Not observed. |

The polyacrylic acid or the salt thereof may be added during the extraction of protein by dispersing an edible protein in water or in an alkali solution.

It may be added to the spinning solution namely dispersion which is obtained by extraction of protein from a edible protein material.

Likewise the said polyacrylic acid and the salt thereof may also be directly added to the coagulation bath.

The first characteristic feature of the present invention is that the protein fiber can be directly and continuously produced from any extract obtained by conventional methods without any steps of preparation, dispersion and peptization of the protein curds. As a result equipment, time, labor, and chemicals such as acids and alkalis can be saved and mechanical loss of the product can be reduced. Furthermore, the inventive process is simplified as compared with the publicly known conventional methods of production for protein fiber.

Nevertheless, it should be noted that polyacrylic acid or the salt thereof can also be used in the conventional methods of producing protein fiber as stated above, namely for example, the said polyacrylic acid or the salt thereof may likewise be added to the solution obtained by dissolving the protein curds.

The second characteristic feature of the present invention is that the dispersed solution of the edible protein material can be directly spun into tough protein fiber without need of removing oil and non-protein substances in the edible protein, thereby the yield of the fiber is very high and the resulted fiber is extremely strong in spite of containing non-protein matters in the resulting protein fiber.

The third characteristic of the present invention is that the concentration of the dispersed solution of the edible protein material can be selected arbitrarily, and any protein solution of lower protein concentration, for example, as low as 2 wt. percent can be spun to useful fiber, consequently there is no necessity of concentration of the dispersed solution, whereas the low viscosity of the dispersed solution facilitates dissolution of the protein by alkali, filtration and make easy the defoaming.

The 4th characteristic of the present invention is that the spinning can be conducted at lower pH range such as at pH 5.5–11. Thus according to the present invention by the simple step of addition of polyacrylic acid or the salt thereof to the dispersed solution of the edible protein material, the extract of the same, or in the coagulation bath the satisfactory spinning conditions can be easily obtained, whereas the conventional methods require higher concentration and higher pH in order to obtain satisfactory spinning. The homogeneous solution obtained by adding polyacrylic acid or the salt thereof to the solution of protein curds in aqueous alkali solution can likewise be subjected to spinning at pH 5.5–11.

The 5th characteristic of the present invention is that the amount of additive ingredients is very low, thus below 2 wt. percent with respect to the protein of the solution, or below 0.5 wt. prcent with respect to acidic coagulating solution of polyacrylic acid or the salt thereof being required for the spinning. Of course, the protein concentration is higher, the amount of the said aid becomes lower.

The required amount of polyacrylic acid or the salt thereof corresponding to the protein concentration of the solution is shown in Experiment 2 and Table 1.

Thus, when the polyacrylic acid or salt is added to the protein solution, 0.1 to 4% by weight of polyacrylic acid or salt is added based on the weight of protein. And when the polyacrylic acid or salt is added to the coagulation bath, more than 0.1%, and preferably 0.3 to 0.5% by weight polyacrylic acid or salt based on the weight of the coagulation bath, is added.

The 6th characteristic of the present invention is that the spinning solution after the addition of polyacrylic acid or the salt thereof has fairly good spinning ability, in spite of extremely low viscosity.

By the conventional methods the spinning often becomes practically impossible due to poor spinning ability, unless the viscosity of the solution is as high as several ten thousands cps. (25° C.).

The ease of the spinning is closely related to the spinning property of the solution, and the latter to the pH value of the spinning solution. The spinning property of the solution becomes maximum at pH 7.5–11 for the protein extract spinning solution with relatively low protein concentration, and the maximum spinning property being found at pH 5.5–10 in the case of the spinning solution with higher protein concentration prepared from protein curds. In any event, the spinning can be conducted conveniently at pH 5.5–11.

The relation between the pH, viscosity and the ease of spinning is shown in Experiment 3, FIG. 1 and Experiment 4, FIG. 2.

The 7th characteristic of the present invention is that the spinning solution can be prepared in a very short time; the time required including the pH regulation is merely about 10 minutes.

The 8th characteristic of the present invention is that polyacrylic acid or the salt thereof exerts an antifoaming effect when added to the protein solution prior to the spinning, the antifoaming effect is particular marked at pH 8–10, and so according to the present invention conventional defoaming step can be avoided.

The antifoaming effect of polyacrylic acid or the salt thereof is shown in Experiment 5 in Table 2.

The 9th characteristic of the present invention is that a neutral salt such as sodium chloride, sodium sulfate, sodium acetate and the like is not required to add in the acid coagulation bath. The acid to be used in the coagulation bath includes hydrochloric acid, sulfuric acid and acetic acid etc. which are conventionally used in acid coagulation baths. However, in the case of using polyacrylic acid or the salt thereof in the coagulation bath, organic acids such as acetic acid, lactic acid, citric acid, and the like are preferred, since hydrochloric acid, sulfuric acid and other mineral acids or the salts thereof may cause precipitation of polyacrylic acid.

The concentration of polyacrylic acid or the salt thereof to be added to the coagulation bath may be more than 0.1%, and preferably at a range between 0.3 and 0.5%.

Whereas the range of the concentration of the acid to be used in the coagulation bath may be varied in a wide range of 0.5–10%.

The 10th characteristic of the present invention is that a fine and tough protein fiber with more favorable color and taste can be obtained as compared with the products obtained by the conventional methods; this may be attributed to avoiding extremely high peptization pH range exceeding 11.5 which may cause destruction of protein.

In conclusion, the process of the present invention brings marked simplification of the process as well as prominent characteristics and hence it is deemed a novel and unique process hitherto unknown.

The advantages of the present invention will be clarified by the description of the following comparative experiments and by the attached drawings.

FIG. 1 is a drawing showing the relation between the pH and the viscosity in the alkali extracted solution on protein;

FIG. 2 indicates the relation between the pH and the viscosity of the solution from protein curds.

EXPERIMENT 1

To an alkaline extract of soya bean protein prepared by a conventional method (protein concentration 5.8 wt. percent, pH 9.0) were added respectively sodium polyacrylate, sodium alginate, propylene glycol alginate, sodium cellulose glycolate, sodium starch glycolate, methyl cellulose, casein, sodium casein, sodium starch phosphate ester and gum tragacanth and dissolved therein. The resulting solutions were extruded from nozzles having a diameter of 0.15 mm. into a coagulation bath containing 5% of hydrochloric acid and 8% of sodium chloride, winding up at a definite velocity on elongation to 1.5 times in the length. The effects on spinning were compared with respect to the kind and the amount of the additives used.

From the results of the above experiment, it can be found that sodium polyacrylate is extremely effective even in amount of 1.0 wt. percent, whereas sodium alginate become active at higher concentrations exceeding 25 wt. percent and result fragile protein fiber.

Propylene glycol alginate, sodium cellulose glycolate and sodium starch glycolate were found to give protein fiber when there were present in the coagulation bath at 50 wt. percent, but the resulted fiber could not be drawn and wound up. In addition, the spinning solution had a tendency to gelatinize.

Casein, sodium casein, and methyl cellulose could not give any effect to the spinning in any addition amount.

Sodium starch phosphate ester, and gum tragacanth caused precipitation of the insoluble matter, but could not give any effect to the spinning in any addition amount.

In conclusion, only extremely impure and low protein content fiber could be obtained in the case of using the any other additives except sodium polyacrylate.

EXPERIMENT 2

A dilute or concentrated alkaline extract of soya bean protein obtained conventionally (pH 9.0) was added to polyacrylic acid and the resulting spinning solution was extruded from nozzles of 0.08 mm. in diameter in a coagulation bath containing 5% sulfuric acid. The protein concentration of the extract during coagulation into protein fiber and the effective amount of polyacrylic acid required were investigated. The results are shown in Table 1.

TABLE 1.—REQUIRED AMOUNT OF POLYACRYLIC ACID TO EFFECT SPINNING

| Protein concentration of the extract (percent) | 2 | 4 | 6 | 8 | 10 | 12 |
|---|---|---|---|---|---|---|
| Amount of polyacrylic acid required * | 4 | 2 | 0.8 | 0.4 | 0.2 | 0.1 |

* Weight percent based on the amount of protein.

The alkaline extract of soya bean protein obtained by the conventional method contains more than 4% of protein, then addition of only 2 wt. percent or more (based on the protein) of polyacrylic acid give useful effect to the spinning.

EXPERIMENT 3

The viscosity of 0.1 wt. percent aqueous solution of sodium polyacrylate, an alkaline extract of soya bean protein prepared by conventional method (protein concentration, 5.3 wt. percent), and a spinning solution obtained by adding 0.1 wt. percent of sodium polyacrylate into the said extract and adjusting pH to 6–12 were compared. The viscosity of the solutions were determined on Brookfield viscometer at 60 r.p.m., 25° C.

FIG. 1 shows the results in which the pH values of the solutions and the viscosities thereof (cps.) being depicted in the abscissa and the ordinate respectively.

Curve A represents the aqueous solution of sodium polyacrylate, curve B, the protein extract, while curve C, represents the spinning solution comprising the protein extract added with sodium polyacrylate.

As evidently shown in the figure, the aqueous solution of sodium polyacrylate A exhibited the maximum viscosity at pH 9.0, while the spinning solution C, at pH 10.5. The spinning property of the spinning solution C was found to be most prominent, at a pH value ranging pH 5.5–11, in particularly, the spinning was achieved very readily at pH 7.5–11. In contrast, the protein extract B without addition of sodium acrylate was unable to be spun at all.

EXPERIMENT 4

Soya bean protein curds were prepared from de-fatted soya bean by a conventional method from which a solution containing 10 wt. percent of protein was prepared and to which was added 0.1 wt. percent of sodium polyacrylate, and the change of the viscosity of the resulting spinning solution was examined. The viscosity of the solution was determined by using Brookfield viscometer at 25° C. at 30 r.p.m. The results are shown in FIG. 2.

Curve D represents the change in the viscosity of the solution prepared from the protein curds, depending on pH whereas curve E denotes the change in the viscosity of the spinning solution obtained by adding sodium polyacrylate to the former. The spinning solution E showed maximum viscosity at pH 7, and the best spinning property at pH 6–10. The spinning solution E could be readily spun at pH 6–11 in particular at pH 7–10, whereas the protein solution D without addition of sodium polyacrylate failed to be spun.

EXPERIMENT 5

The alkali extract of soya bean protein (protein concentration 4.0 wt. percent) are prepared and the spinning solution prepared from said extract by adding 0.1 wt. percent of sodium polyacrylate following adjustment of pH value to pH 6–12 either with hydrochloric acid or sodium hydroxide solution. The foaming property of both solution was compared. The foaming property was examined by measuring the height of bubbles formed from 100 ml. of the test solution after stirring in Waring blender at 10,000 r.p.m., at room temperature for 30 minutes followed by standing for 3 minutes. This property represents the volume percent of the bubbles versus the total volume of the solution including the bubbles. The antifoaming effect exerted by sodium polyacrylate was calculated according to the following formula:

Antifoaming effect (percent)

$$= \frac{\left(\begin{array}{c}\text{Bubble height of}\\ \text{extract (mm.)}\end{array}\right) - \left(\begin{array}{c}\text{Bubble height of the}\\ \text{spinning solution (mm.)}\end{array}\right)}{\left(\begin{array}{c}\text{Bubble height}\\ \text{of the extract, mm.}\end{array}\right)} \times 100$$

Table 2 shows the results obtained, indicating that outstanding antifoaming effect was achieved at pH 8–10 for the spinning solution.

TABLE 2.—ANTIFOAMING EFFECT EXERTED BY SODIUM POLYACRYLATE

| pH of the extract | pH of the spinning solution added with sodium polyacrylate | Volume of bubbles (percent) Extract | Volume of bubbles (percent) Spinning solution | Antifoaming effect |
|---|---|---|---|---|
| 6 | 6.4 | 54 | 85 | −57 |
| 7 | 7.3 | 54 | 94 | −90 |
| 7.5 | 7.7 | 54 | 93 | −9 |
| 8 | 8.1 | 54 | 22 | 66 |
| 9 | 9.0 | 52 | 18 | 72 |
| 10 | 9.9 | 52 | 22 | 64 |
| 11 | 10.8 | 57 | 98 | −166 |
| 12 | 11.7 | 85 | 99 | −47 |

The present invention is now illustrated further by the following preferred examples.

EXAMPLE 1

Ten parts soya bean powders (nitrogen 5.7%, oil 17.6%, ash 5.3%, moisture 10.8%, particle size 150 meshes, passing) was added to 100 parts of water and the mixture stirred for 15 minutes. The pH value of the mixture was then adjusted to 7 with a sodium hydroxide solution. To the resultant composition was added 0.1 part of sodium polyacrylate and the resulted spinning solution was extruded from nozzles of 0.5 mm. in diameter into a coagulation bath containing 3% acetic acid and 5% sodium chloride. The filaments produced were elongated 1.5 times in length by winding at a definite velocity. The protein fiber thus formed was neutralized, bleached and rinsed with water to give a product with very favourable color and taste and the characteristics shown below: pH 6.5, moisture 59.4%, nitrogen 2.5%, oil 7.6%, ash 1.5%, diameter of the fiber 0.12 mm. (cf. the diameter of the fiber obtained by extruding a protein solution from the nozzles of the same nozzles by conventional means was 0.32 mm.), reflectivity 68.8% (reflectivity of the fiber by the conventional methods 56.2%).

Thus use of sodium polyacrylate was very effective.

EXAMPLE 2

Ten parts of low denatured defatted soya bean powders (nitrogen 8.0%, soluble nitrogen 91.6%, oil and fats 0.17%, ash 5.8%, moisture 9.4% having a particle size of—150 mesh 0.1 part, ammonium polyacrylate, and 70 parts water were mixed and stirred for 15 minutes. Thereafter the pH of the composition was adjusted to 9 with sodium hydroxide. The resulted spinning solution was extruded through nozzles of 0.3 mm. in the diameter into a coagulation bath comprising 5% hydrochloric acid solution, and the extrudate produced wound up to obtain edible protein fiber. Spinning solutions without the addition of polyacrylic acid could not be spun at all.

EXAMPLE 3

One part defatted soya bean was extracted with 8 parts of an alkaline solution of sodium hydroxide having pH of 9. The resulted alkali extract of 5.8% protein concentration, after removal of the insoluble matter was added with 1.0 wt. percent based on the weight of the protein in tne extract of ammonium polyacrylate. The thus prepared spinning solution was extruded through nozzles of 0.15 mm. in the diameter into a coagulation bath comprising a 3% aqueous hydrochloric acid solution. The extrudate produced was thereafter elongated to 1.5 times its length by winding at a constant velocity to produce protein fiber. After neutralization, bleaching and washing with water an edible protein fiber with the following characteristics was obtained:

pH 6.5, moisture 74.8%, diameter of the fiber 0.06 mm. (cf. conventional protein fiber 0.1 mm.), reflectivity 60.2% (cf. conventional fiber 54.8%).

Use of ammonium polyacrylate proved to be effective, since without it, spinning was impossible.

EXAMPLE 4

One part defatted peanuts (moisture 8.2%, nitrogen 6.4%, oil 6.8%, ash 5.5%) was extracted with 10 parts of an alkaline solution of water and sodium hydroxide having a pH of 10. After removal of insoluble matter, the alkali extract, which had a protein concentration of 4.2 wt. percent, was admixed with 0.8 wt. percent based on the weight of the protein in the extract of sodium polyacrylate. The resulted spinning solution was extruded through nozzles of 0.1 mm. in the diameter into a coagulation bath containing 5% sulfuric acid to give edible protein fibers on winding. Use of sodium polyacrylate proved to be essential.

EXAMPLE 5

1 part defatted soya bean was extracted with 10 parts of an aqueous sodium hydroxide solution of pH 9. Insoluble matter was thereby removed, and then the protein was coagulated and precipitated from the extract by adding sulfuric acid to pH 4.5. Protein curds were recovered by centrifuging and the curds were then dissolved in an aqueous alkaline solution to obtain a protein solution of 10 wt. percent protein at a pH of 10. 0.5 wt. percent based on the weight of the protein in the extract of sodium polyacrylate was added to the protein solution, and the resultant spinning solution processed as described in Example 3 to give protein fibers with extremely good chewing property, color tone and taste. The alkaline solution without addition of sodium polyacrylate proved to be difficultly spun at the same pH value.

EXAMPLE 6

Protein curds obtained from defatted soya bean in the similar way as described in Example 5 were extracted with aqueous sodium hydroxide solution to prepare a spinning solution having a protein concentration of 9%, pH 10, and a viscosity of 1200 cps. (25° C.). After defoaming and filtering the solution was extruded through nozzles of 0.08 mm. in the diameter into a coagulation bath comprising 3% acetic acid, 0.4% sodium polyacrylate and having a pH of 2.2, and a viscosity of 48 cps. (20° C.). The extrudate was elongated to 3 times of the original length by winding at constant velocity, and the fibers were then neutralized, unbleached and rinsed with water to give protein fibers of high elasticity, pH 6.5, moisture 70% and 0.04 mm. in diameter.

EXAMPLE 7

Casein powders with a moisture content of 8.3%, and a nitrogen content of 14.4% were treated with an aqueous sodium hydroxide solution at pH 10.5 to obtain a spinning solution containing 20.2% of the protein. The spinning solution was extruded through nozzles of 0.05 mm. in diameter into a coagulation bath the same as described in Example 6. The extrudate was then elongated to 1.5 times in the length and wound up. After neutralizing, bleaching and rinsing with water, protein fibers with high elasticity, pH 5.0, moisture 68% were obtained.

We claim:

1. A process for producing edible protein fibers comprising continuously extruding a spinning solution of the protein in the form of filaments into an acid coagulation bath, said process characterized in that the spinning solution has a pH of between 5.5 and 11.0 and the spinning is carried out in the presence of an additive selected from the group consisting of polyacrylic acid and the alkali metal and ammonium salts thereof in an amount of from 0.1 to 4.0% based on the weight of protein in the solution or in an amount above 0.1% by weight of the coagulation bath.

2. A process according to claim 1 wherein the polyacrylic acid or salt thereof is added during dissolution of the edible protein material in water by an aqueous alkali solution, the polyacrylic acid or salt thereof being added in an amount of from 0.1 to 4.0% based on the weight of protein in the solution.

3. A process according to claim 1 wherein the polyacrylic acid or salt thereof is added to the coagulation bath in an amount above 0.1% by weight of the bath.

4. A process according to claim 3 wherein the polyacrylic acid or salt thereof is added to the coagulation bath in an amount between about 0.3 to 0.5% by weight of the bath.

5. A process according to claim 1 wherein the polyacrylic acid or salt thereof has an average degree of polymerization of at least 15,000.

6. A process according to claim 5 wherein the average degree of polymerization of said polyacrylic acid or salt thereof is between about 30,000 and 60,000.

7. A process according to claim 1 wherein the concentration of protein in the spinning solution is between about 2% and 12% by weight.

References Cited

UNITED STATES PATENTS

| | | | |
|---|---|---|---|
| 2,682,466 | 6/1954 | Boyer | 99—14 |
| 3,177,079 | 4/1965 | Kuramoto | 99—17 |

RAYMOND N. JONES, Primary Examiner

W. A. SIMONS, Assistant Examiner

U.S. Cl. X.R.

99—17, 18, 20; 260—112, 117, 119, 123.5